(12) United States Patent (10) Patent No.: US 7,463,435 B1
Arnold (45) Date of Patent: Dec. 9, 2008

(54) KINEMATIC MOUNTING FOR AN OPTIC ON GLASS SUBSTRATE FOR USE WITH AN INTERFEROMETER

(75) Inventor: Steven M. Arnold, Minnetonka, MN (US)

(73) Assignee: Diffraction International, Ltd., Minnetonka, MN (US)

( * ) Notice: Subject to any disclaimer, the term of this patent is extended or adjusted under 35 U.S.C. 154(b) by 672 days.

(21) Appl. No.: 11/145,479

(22) Filed: Jun. 3, 2005

Related U.S. Application Data

(60) Provisional application No. 60/577,304, filed on Jun. 4, 2004.

(51) Int. Cl.
*G02B 7/02* (2006.01)
(52) U.S. Cl. ...................... 359/819; 359/827
(58) Field of Classification Search ............. 362/33, 362/97, 382, 432, 455; 356/450; 359/819, 359/822, 827
See application file for complete search history.

(56) References Cited

U.S. PATENT DOCUMENTS

| 5,486,917 | A | * | 1/1996 | Carangelo et al. ........... 356/450 |
| 5,530,547 | A |   | 6/1996 | Arnold ....................... 356/354 |
| 6,538,747 | B1 |  | 3/2003 | Arnold ....................... 356/512 |
| 2007/0230177 | A1 | * | 10/2007 | Suzuki ....................... 362/382 |

* cited by examiner

*Primary Examiner*—Y My Quach Lee
(74) *Attorney, Agent, or Firm*—Westman, Champlin & Kelly, P.A.

(57) ABSTRACT

An optical pattern that is to be supported for examination is formed on a surface of a substrate, generally glass. Corner brackets are fixedly mounted on the substrate. Each of the corner brackets has a support portion and a housing that mounts a locating ball or sphere that protrudes out of the housing. The housing is connected to the support portion of the respective bracket through a flexure hinge that permits movement of the housing and supported ball in a plane generally parallel to the surface of the substrate having the optical pattern.

17 Claims, 14 Drawing Sheets

KINEMATIC MOUNTING FOR AN OPTIC ON GLASS SUBSTRATE FOR USE WITH AN INTERFEROMETER

This application refers to and claims the benefit of priority on U.S. Provisional Application Ser. No. 60/577,304, filed Jun. 4, 2004, the contents of which are incorporated by reference.

BACKGROUND OF THE INVENTION

The present invention relates to a mounting arrangement for supporting a substrate having an optical pattern formed one surface, onto a mount plate that is connected to an instrument of a bench. The optical pattern can be a computer generated hologram (CGH) that is to be used in testing of aspheric optical components.

U.S. Pat. No. 5,530,547 describes a system for aligning optical elements for testing aspheric optical components. In the '547 patent, a frame is provided with spherical (ball shaped) mounts that are supported in turn on positioning pins carried on a mount plate. The mount plate is supported on a base, which in turn is capable of being attached to an optical table, rail, bench or the like. The mount plate illustrated in the '547 patent works well with smaller optical elements, but when larger CGH patterns are to be checked, a peripheral frame becomes large and difficult to keep stress free. The frame should be made of a material that has near zero thermal expansion coefficient, such as Invar, to insure accuracy. Frames for larger substrates carrying optical patterns cannot readily be made of Invar or similar materials because of the high material weight and the high cost. Using aluminum frames for the larger optical patterns has disadvantages, particularly in relation to likely movement of elastomers used for supporting for the optical element and the possible distortion of the glass supporting the optical element.

SUMMARY OF THE INVENTION

The present invention relates to an optical element mounting system for providing a plurality of precision mounting spheres or balls to support a plate-like substrate, preferably a glass plate, carrying the optical pattern of interest. The system uses individual corner brackets that are attached directly to a plate-like substrate carrying the optical pattern. The substrate can be a square standard size glass photomask, which is 6"×6"×¼" thick. The optical pattern can be fabricated on a surface of such substrate in a precise location without stressing the substrate. The positioning balls are mounted on individual corner brackets that are secured to the substrate.

Flexures are provided between the housing or mount for each positioning ball and the base of the corner bracket that carries that ball. The flexures are formed so that the ball can be adjusted by manual adjusters in a single axis parallel to the glass plate surface and perpendicular to its diagonal and moved to be precisely positioned on diagonal lines of the optical pattern. The center of each of the balls used at opposite corners of the substrate can thus be precisely positioned on the diagonal line of the optical pattern. The optical pattern is located relative to a mount plate by the standard pins on the mount plate engaging the mounting balls. The mount plate is supported on a positioner or adjustment frame, and supported in turn on to an interferometer bench or other instrument.

The corner brackets or corner frames can be made in different forms, and the brackets are attached to the substrate in a manner that insures they will be stable, such as adhesive bonding.

The corner brackets are mounted only at the corners of the substrate carrying the optical pattern, so the corner brackets are connected to one another only by the substrate. The corner brackets therefore do not introduce bending stresses within the central region of the optical pattern on the substrate.

Also, the use of separated corner brackets that are bonded directly to the substrate requires less material for the corner brackets than a full frame of the same material around the periphery of the substrate. The corner brackets can be made of Invar or other similar material to match the thermal coefficient of expansion of the preferred substrate material, silica glass, without imposing excessive weight or cost. Other metals or materials that have desired characteristics can be used more easily as well.

Another advantage of the present system is that commercial silica photomask blanks are an economical starting material when substrates must be optically polished to high accuracy for forming the optical pattern.

The precision mounting spheres or balls may be bonded in the provided bores in the corner brackets after the corner brackets have been bonded to the substrate, and after the balls have been precisely aligned or positioned insuring that the balls always are the desired distance from the plane of the optical face. This positioning before bonding insures the correct spacing of the optical face from the ball support plane on the substrate.

The corner brackets have machined surfaces that receive a corner portion of the substrate, and in one form a gasket is placed between one surface of the bracket and the support surface of the substrate. The gasket thickness is precisely controlled. The gaskets, as shown, have slots therein that can be filled with adhesive for bonding the corner brackets onto the surface of the substrate having the optical pattern thereon, with a very precisely controlled adhesive layer thickness to insure that the corner brackets are correctly held and will not shift. In another form, a machined surface supports the substrate and a recess for receiving a layer of adhesive is machined into the surface.

DETAILED DESCRIPTION OF THE PREFERRED EMBODIMENTS

Reference again is made to U.S. Pat. No. 5,530,547 for disclosure of the base and mounting arrangements used for supporting optical elements, and the disclosure of U.S. Pat. No. 5,530,547 is incorporated by reference.

Figure 1:
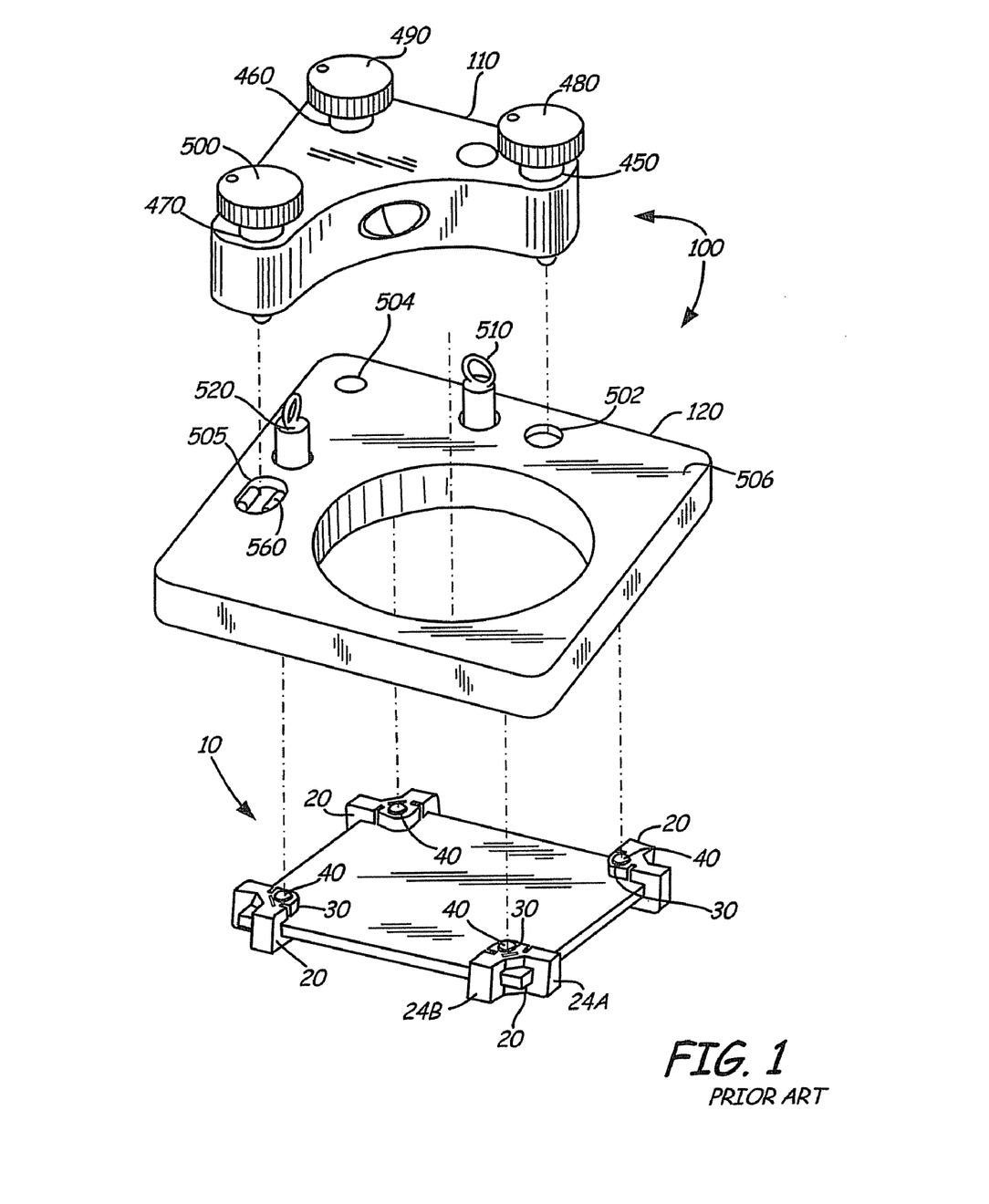
FIG. 1 is a replication of FIG. 3 of U.S. Pat. No. 5,530,547, illustrating how the substrate and corner brackets of the present invention would be positioned relative to the mounting plate and support base disclosed in such patent.

FIG. 1 corresponds to portions of FIG. 3 of U.S. Pat. No. 5,530,547 insofar as the mounting plate and base are concerned. The mount base shown at 110 is used for mounting a mounting plate 120 that is adjustably attached to the mount base 110. The position of mount base 110 is adjustable in three axes.

In place of the optical element frame shown in U.S. Pat. No. 5,530,547, the optical pattern supporting substrate and corner bracket assembly of the present invention indicated generally at 10 is used. This can be coupled to the mount plate shown in U.S. Pat. No. 5,530,547 in the same manner as that described in the patent. The mount base 110 is capable of being attached to an optical table, rail, bench or the like, which are not shown. The three axis optical element mount base 110 includes three threaded bores 450, 460, 470 in which first, second and third adjustment screws 480, 490, 500, respectively, are threaded. The adjustment screws are preferably precision ball tip screws. The threaded bores 450, 460, 470 are preferably arranged at three corners of a square with the fourth corner coinciding with the optical axis 180 of an optical pattern to be analyzed. The optical element mount base 110 has an "L" shaped configuration. The threaded bores 450 and 470 are located adjacent the ends of the legs of the "L", and the bore 460 is at the junction between the legs of the "L". Other configurations can be utilized, including the six axis mount shown in U.S. Pat. No. 5,530,547. Adjustment screws 480, 490, 500 engage the mount plate 120 at receptacles 502, 504, 505, respectively, formed in the surface 506 of the mount plate 120 facing the optical element mount base 110. In the simplified showing of FIG. 1, the mount plate 120 is held to the optical element mount base 110 by a pair of coil springs 510, 520, which are maintained under tension as the mount plate 120 bears against the ends of screws 480, 490 and 500.

The underside of the mount plate 120 has an assembly surface 300 (see FIG. 1A), and it is formed to position and support the planar substrate and corner bracket assembly 10. The assembly surface 300 includes three recessed sites 330, 340, 350 positioned to receive three of the balls or registration spheres 40 that are carried by the corner brackets of the assembly 10, as will be shown. Each of the sites 330, 340 and 350 receives one of the balls or spheres. The balls are positioned with and engage pairs of rods 390A, 390B, 400A, 400B, 410A, 410B, respectively, that form mechanical restraints for the balls for positioning the locator glass substrate and corner bracket assembly 10.

The above description of the mount plate and base is related to the description of these components in U.S. Pat. No. 5,530,547.

Referring to FIGS. 2-11, this form of the invention as shown, includes a standard glass substrate 12 that can be, as mentioned, a standard size photomask that has an optical pattern outlined generally at 14 for purposes of discussion, on an upper surface 16 of the substrate.

Figure 2:
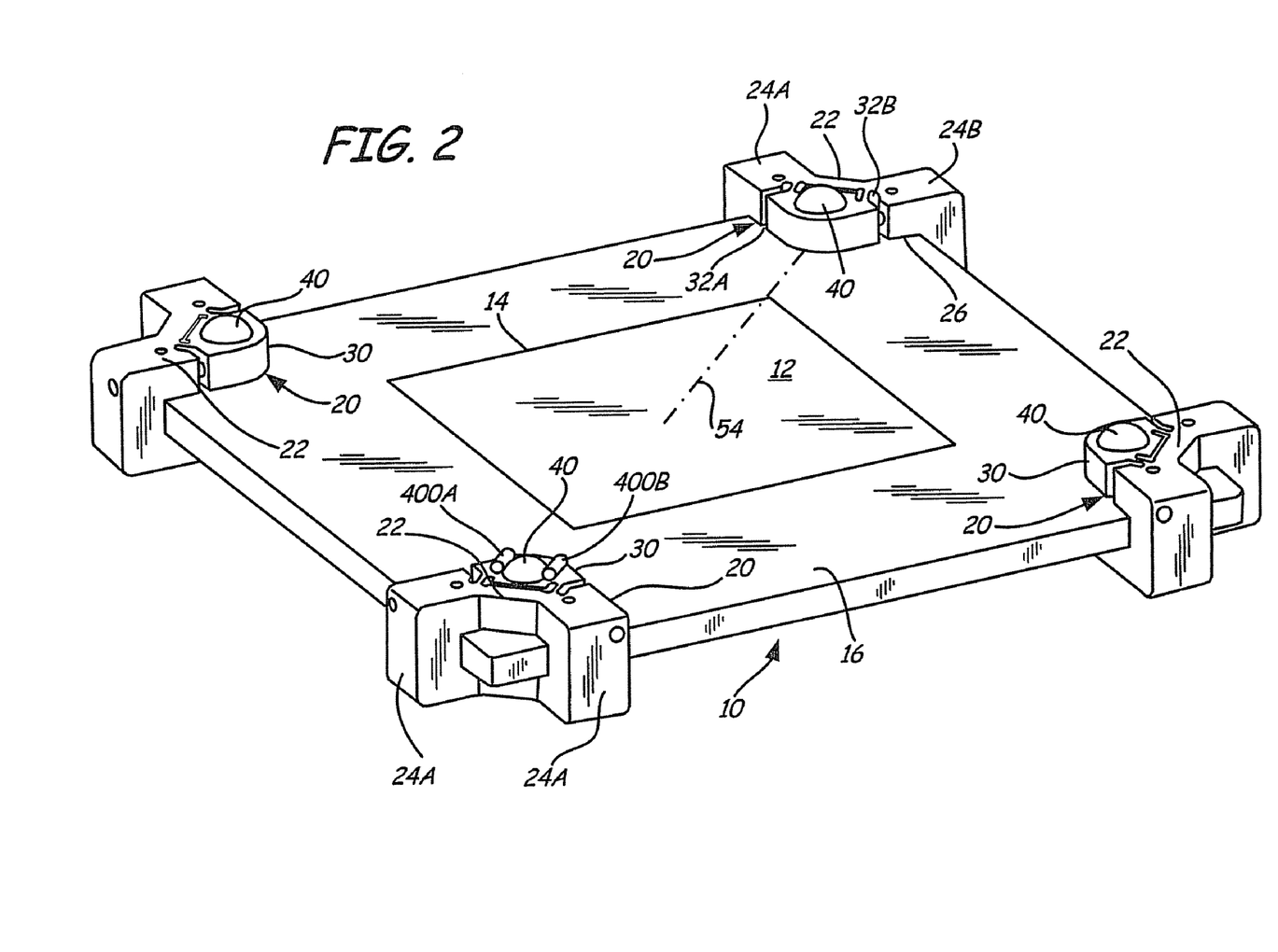
FIG. 2 is an enlarged perspective view of a substrate having corner brackets according to the first form of the present invention mounted thereon.

Substrate 12 has four corner brackets 20 installed thereon, which are secured to the corners of the substrate. Each of these corner brackets 20 is identically constructed and is used for supporting the surface 16, and thus the optical pattern 14, on the mount plate 120, for desired purposes.

Each of the corner brackets 20 is made of a unitary block of material that has a center section 22, and two end sections 24A and 24B that are at right angles to each other, and which form support portions of the corner bracket.

Figure 7:
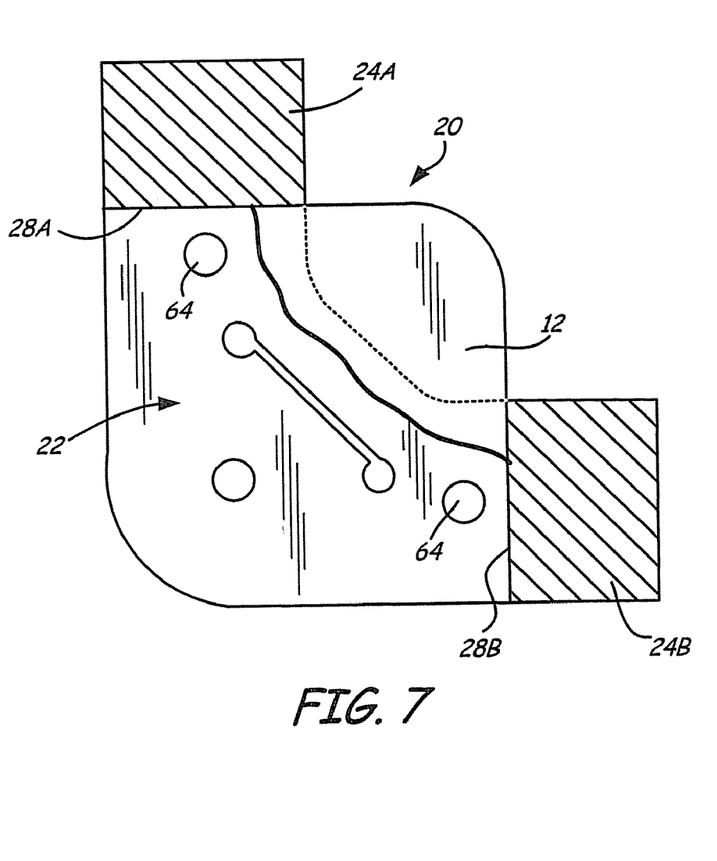
FIG. 7 is a sectional view taken as on line 7-7 in FIG. 4.
Figure 8:
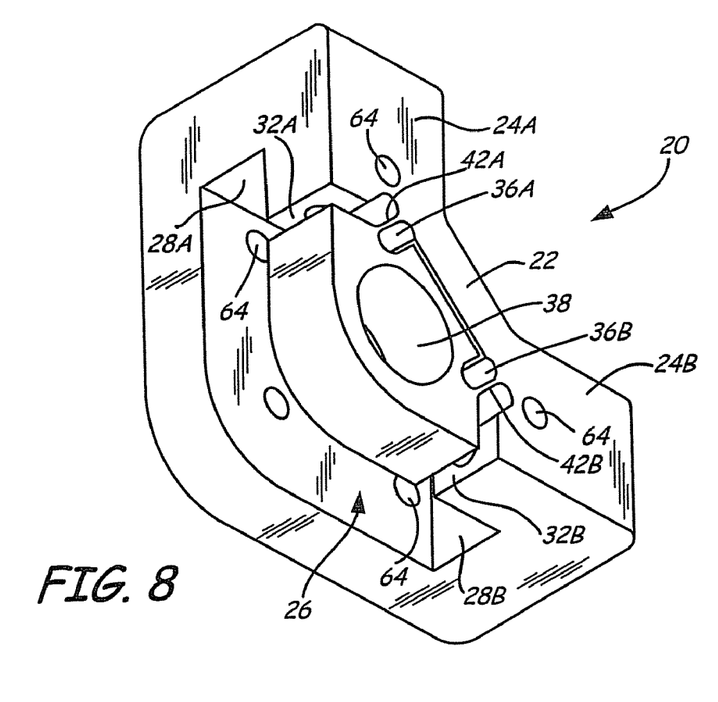
FIG. 8 is a perspective view of the corner bracket of the first form of the present invention.

A substrate receiving or mounting slot 26 is machined into the center section 22 of the bracket 20, and the slot has side surfaces that are perpendicular to each other. These side surfaces shown at 28A and 28B, respectively in FIG. 7, are made so that they will engage the edge surfaces of the glass substrate 12, as shown schematically in FIG. 7, for example. Slot 26 is just slightly wider than the thickness of the substrate, and the corner brackets 20 can be slipped onto the respective corner portions of the substrate or photomask 12, as shown.

Figure 6:
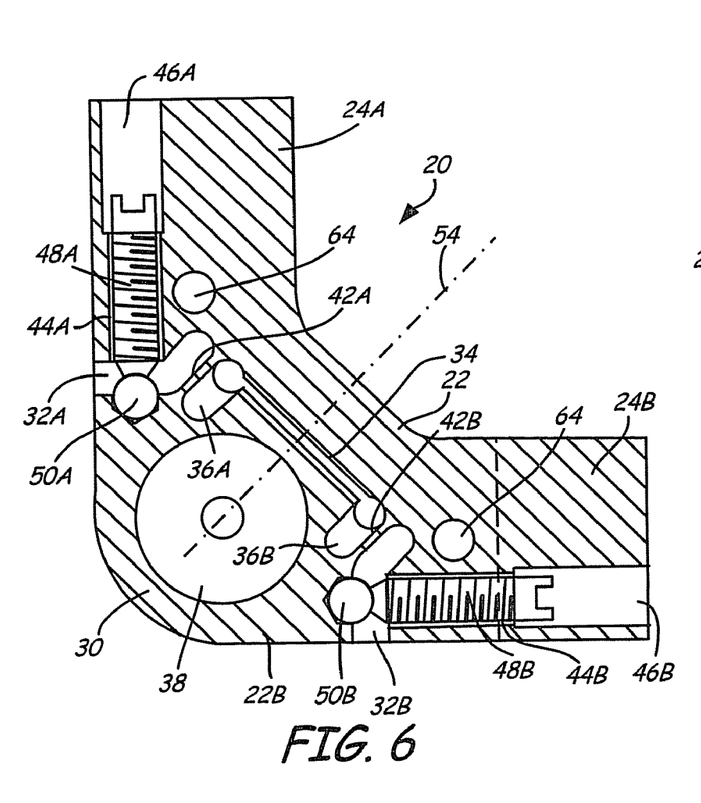
FIG. 6 is a sectional view taken as on line 6-6 in FIG. 4.

The portion 22A of the center section 22, which has the bottom surface of slot 26 thereon, is unitary with the end sections or portions 24A or 24B. However, the upper portion 22B of the center section, above the slot 26 in the center section 22 includes a ball or sphere mounting housing 30 above the slot 26. The housing 30 is separated from the end sections 24A and 24B of the bracket by slots 32A and 32B, respectively. The ball mounting housing 30 is also separated from the rear portion of the center section 22 with a slot 34. The slot 34 has end sections 36A and 36B, respectively. The mounting housing 30 has a bore 38 that is of size to receive a chrome steel mounting ball or sphere 40 without excessive play. In other words, ball 40 slip fits into the bore 38 that is shown in FIG. 6.

The slots 32A, 32B, 36A, and 36B form planar flexure members or webs 42A and 42B that are the sole support for the ball mounting housing 30 relative to the center section 22. In other words, the housing 30 can be flexed relative to the rest of the corner bracket by bending the flexures 42A and 42B, in direction perpendicular to the plane of the flexures.

The positioning of the housing 30 and thus the ball 40 can be controlled by bending the flexures 42A and 42B. The upper portion of the corner bracket has threaded bores 44A and 44B formed therein, with counter sunk end bores 46A and 46B. Screws shown at 48A and 48B are threaded into the bores 44A and 44B. These will bear against small balls 50A and 50B that are positioned in bores, or otherwise held in pockets on the side surfaces of the ball housing 30 that are defined by the slots 32A and 32B. The balls 50A and 50B are on the opposite sides of the slots 32A and 32B from the threaded bores 44A and 44B. It thus can be seen that the ball mounting housing 30 is very stiff in direction perpendicular to the surface 16 (parallel to the plane of the flexures), but by adjusting the screws 48A and 48B, the central axis of the bore 38 (which is perpendicular to surface 16), and thus the ball 40 that is supported therein, can be moved transversely to a diagonal line across the optical image 14. Such a line is schematically illustrated at 54, in FIG. 6, and also in FIG. 2.

Figure 3:
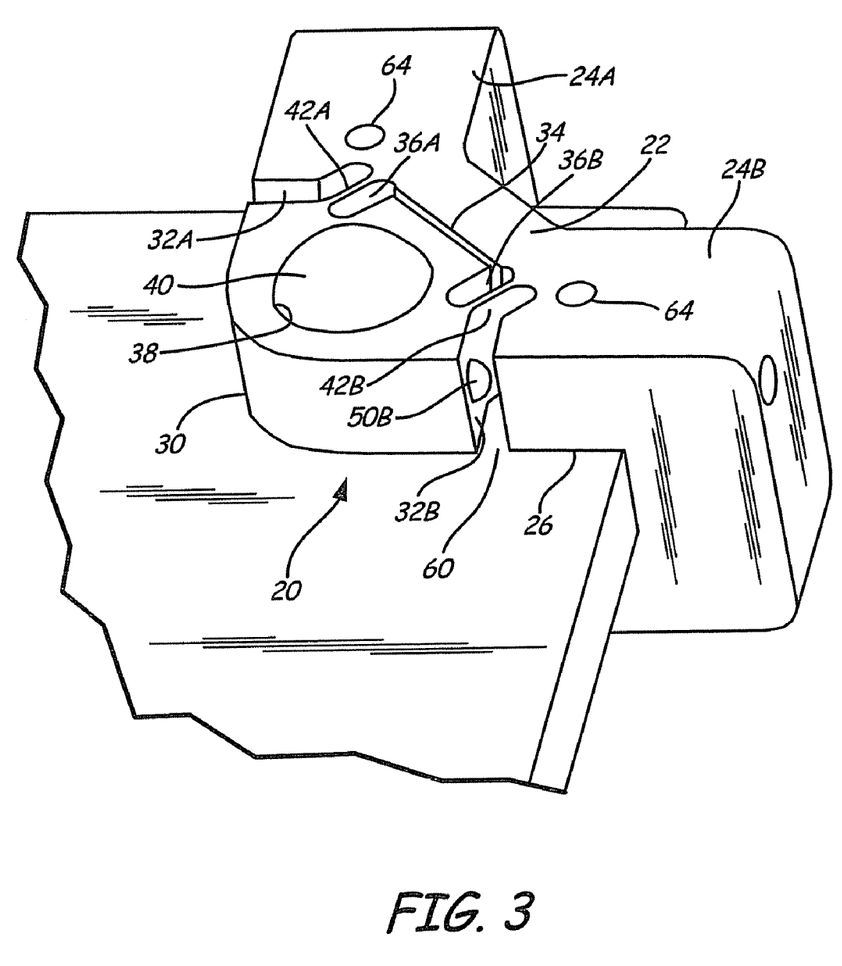
FIG. 3 is a further enlarged view of a single one of the corner brackets showing a support ball and the flexure mounting for the support ball relative to the base portion of, the bracket.
Figure 4:
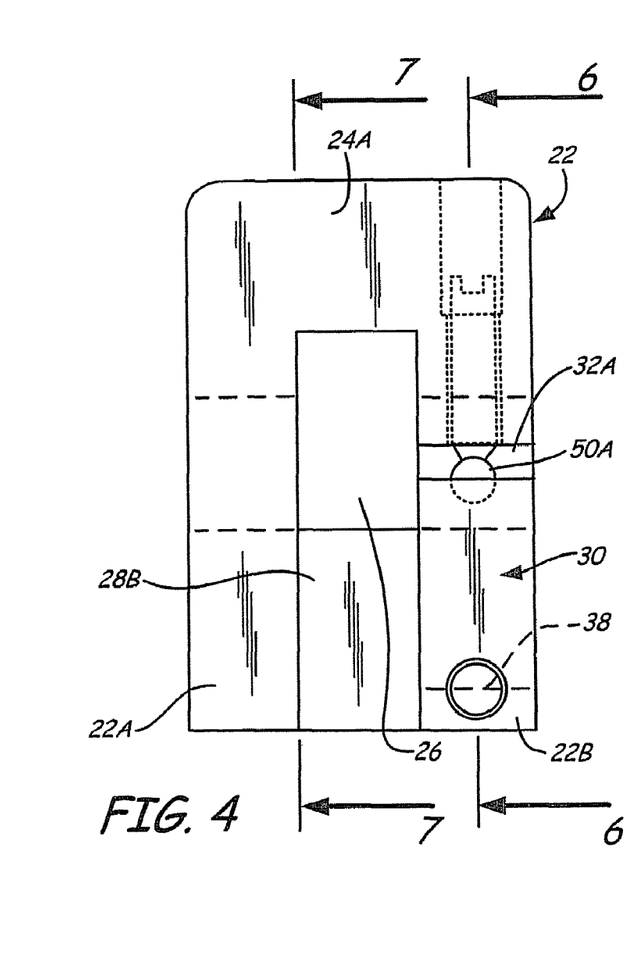
FIG. 4 is a side elevational view of a corner bracket made according to the first form of the present invention.
Figure 9:
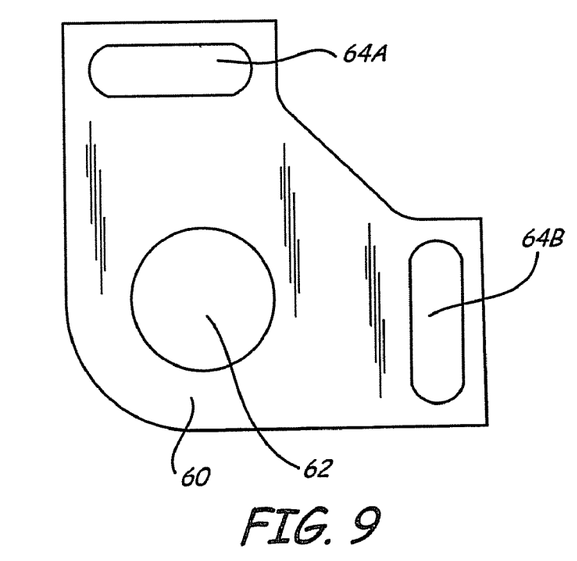
FIG. 9 is a plan view of a gasket utilized with the present corner brackets showing adhesive thickness control slots.

When mounting the corner brackets 20 onto the substrate 12, gaskets, one of which is shown schematically at 60 in FIG. 3, and separately in FIG. 9, are placed between the upper surface 16 of the substrate, and the surface defined by the upper side of the mounting slot 26. A similar gasket can be placed in the mounting slot 26 on the lower side of the substrate 12 as well.

Figure 5:
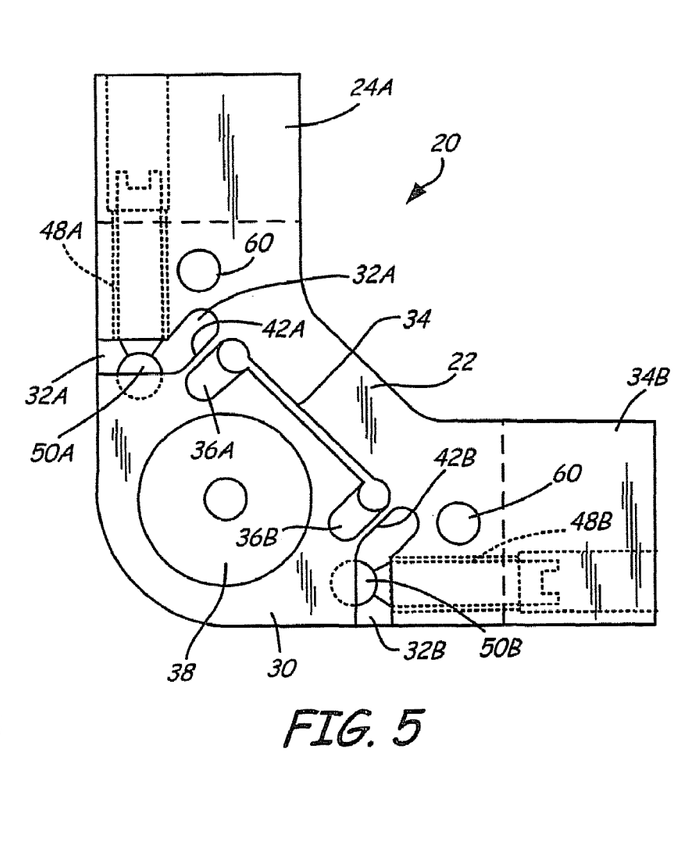
FIG. 5 is a top plan view of the corner bracket of FIG. 4.

As can been seen in FIG. 9, the gasket 60 is provided with a center opening 62 that will permit the ball 40 to pass through the gasket 60 and rest on substrate surface 16. The gasket 60 also has slot like openings 64A and 64B that are underneath the end sections 24A and 24B of the corner bracket, respectively, when installed as shown in FIG. 5. The slots 64A and 64B provide an open area in which an adhesive can be retained for securing the corner brackets 20 to the substrate. Because the gasket 60 is made of a precise thickness material, such as mylar, which may be in the range 0.2 mm, the thickness of the adhesive layer bonding and supporting the corner brackets is precisely known. Adhesive is restricted to the slot regions 64A and 64B. The minimal thickness insures that the corner brackets 20 are held properly on the substrate surface and will not be supported unevenly. The gasket 60 can also be placed on the underside of the substrate 12, in the slot 26 as well. On the underside of the substrate, the ball opening 62 in the gasket also can be filled with adhesive because the ball remains above the substrate.

It can thus be seen that the ball 40 carried in the bore 38 of the ball housing 30 is capable of being moved, as supported by the flexures 42A and 42B, in a plane parallel to the surface of the substrate. This movement is thus parallel to the optic pattern 14. The screws 48A and 48B can be adjusted so that the center of the ball 40 will lie on the diagonal line which is represented at 54, which is the diagonal line of the optical image or pattern.

In FIG. 2, support rods or pins 400A and 400B from mount plate 120 (FIG. 1A) are shown on one ball 40.

The corner brackets 20 can have openings 64 through which adhesive can be injected into the slots 64A and 64B in the gasket 60.

After the corner brackets 20 have been positioned on the substrate and secured in place, the balls 40 will contact the glass surface 16 through the openings 62 in the gaskets 60, and after alignment in the plane of surface 16, the balls 40 can also be secured in place in the bores 38 with adhesive.

The gaskets 60 are not only helpful for precisely measuring or holding the adhesive, but also provide a low friction surface for movement of the housing 38 during adjustment of the screws 48A and 48B.

The flexure mounting of the balls 40 permits the adjustment that is necessary, and yet the flexures are stiff in direction perpendicular to the surface of the substrate so that a full frame is not required. The corner brackets 20 reduce the likelihood of unwanted stresses in the optical pattern on the substrate 12, which is generally glass, and also reduce the costs when large patterns are to be positioned over that which would be required by a full frame. The material for the corner brackets 20 thus can be quite exotic and expensive without increasing the costs of the support structure unduly.

Figure 10:
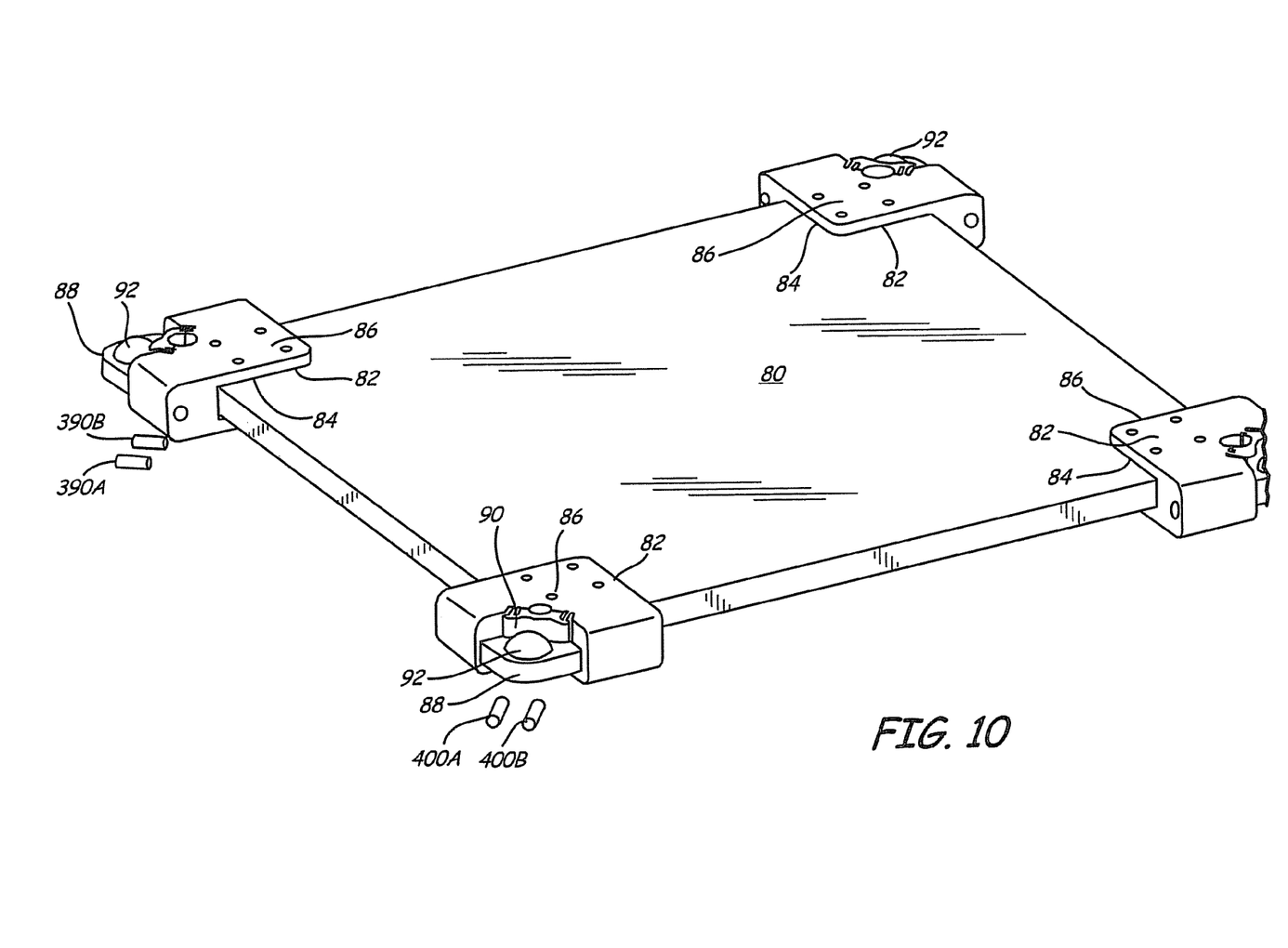
FIG. 10 is a perspective view of a second form of the corner bracket shown mounted on to a portion of a substrate.
Figure 11:
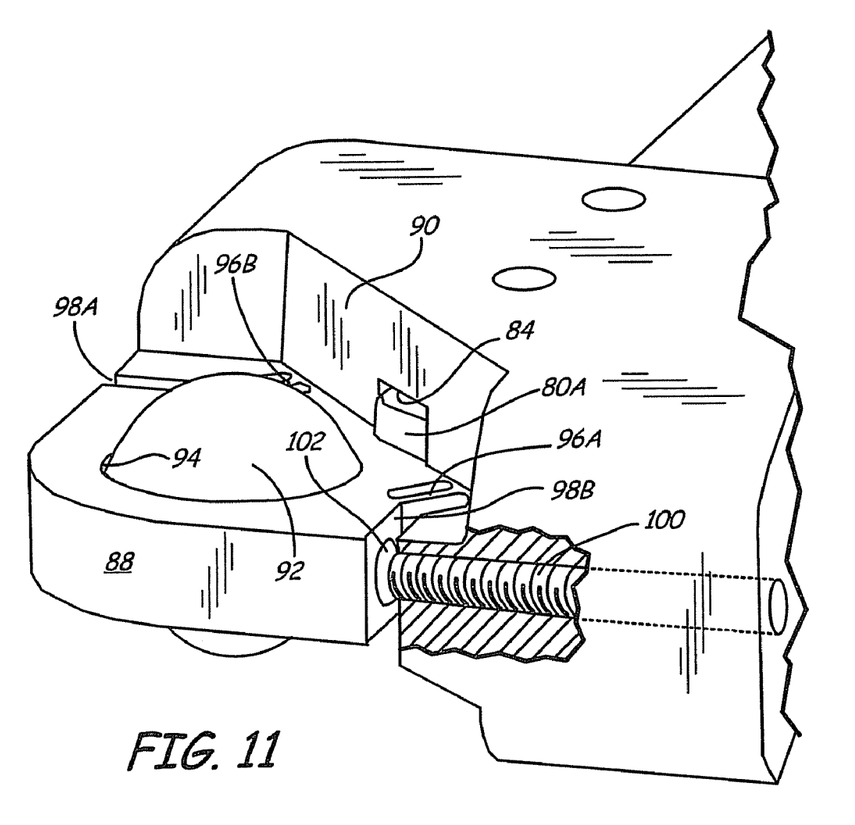
FIG. 11 is an enlarged perspective view of the modified form of the corner bracket shown in FIG. 10.

A second form of the corner brackets is illustrated in FIGS. 10 and 11. The construction of the flexure mounting for the housing holding spherical balls is the same, but in this case, a substrate 80 has corner brackets 82 thereon that have a mounting slot 84 and are shaped to fit over the corners of the substrate 80. The mounting is done in the same manner as previously explained. However, the main support portion 86 of the corner bracket 82 overlies the corner portion of the substrate, and in turn supports a ball housing 88 to the exterior of the corner of the substrate. The ball housing is supported outside of the periphery of the substrate 80.

The corner of the substrate can be seen in FIG. 11 where it protrudes through an opening formed in a surface 90 that is machined when a ball housing 88 is formed. The ball housing 88 is recessed below an upper surface of the corner bracket shown in FIG. 11. A ball 92 is mounted in a bore 94 of the ball housing 88, as in the first form of the invention. The ball housing 88 is connected to and supported on the main support portion 86 of the corner bracket 82 through flexures 96A and 96B that are formed by suitable slots 98A and 98B, which are shown fragmentarily, but are formed to separate out the ball housing 88 from the main portion 86 of the corner bracket 82 in the same manner as slots 32A and 32B in the first form of the invention.

The flexures are planar and the planes of the flexures are perpendicular to the surface plane of the substrate 80 to permit movement of the ball housing 88 and the ball 92 in a plane parallel to the surface of the substrate 80. The flexure movement permits moving the balls 92 into alignment with a diagonal line of a optical pattern on the substrate 80. This, again, is accomplished by utilizing screws 100 that bear against the sides of the ball housing and extend across slots 98A and 98B. The screw 100 is shown typically in FIG. 11, and is threaded through a bore in the main support portion 86 of the corner bracket 82. The screw 100 bears against a ball 102 that is supported on the ball housing 88 in alignment with the screw 100. A second screw is provided that extends across the slot 98A to provide for adjustment of the housing 88 after the four corner brackets are placed on a substrate 80.

Figure 1A:
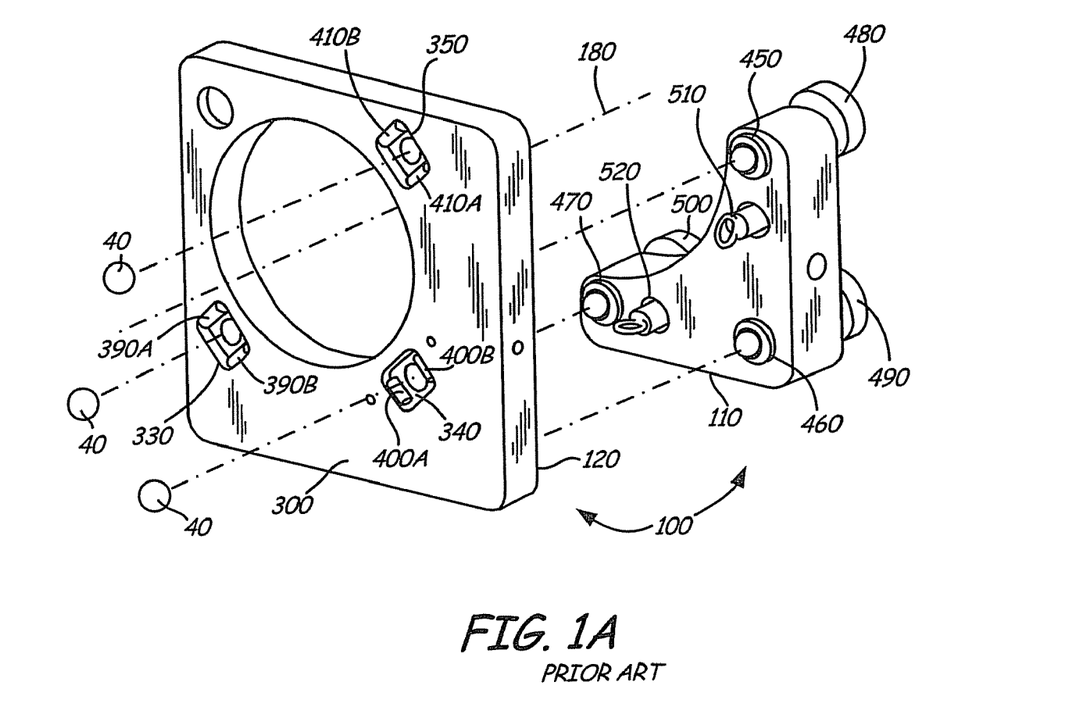
FIG. 1A is a view of the mount plate of FIG. 1 showing the supports on the mount plate for receiving balls carried on the corner brackets of the present invention.

It can be seen that with the support balls 92 are to the exterior of the periphery of the substrate 80, so a different mount plate must be utilized from that shown in FIGS. 1 and 1A, but the same concept of using support seats on a mount plate that will receive and support three of the balls 92 at the corners of the substrate is maintained. The typical mounting rods 390A and 390B, 400A and 400B shown in FIG. 1A are shown adjacent two balls 92 in FIG. 10. The corner brackets give precise positioning of the glass substrate and the optical pattern on the upper surface of the glass substrate on the mounting plate.

The mount plate used can then be mounted onto suitable brackets for mounting onto instruments, such as an interferometer, bench supports or the like.

Figure 12:
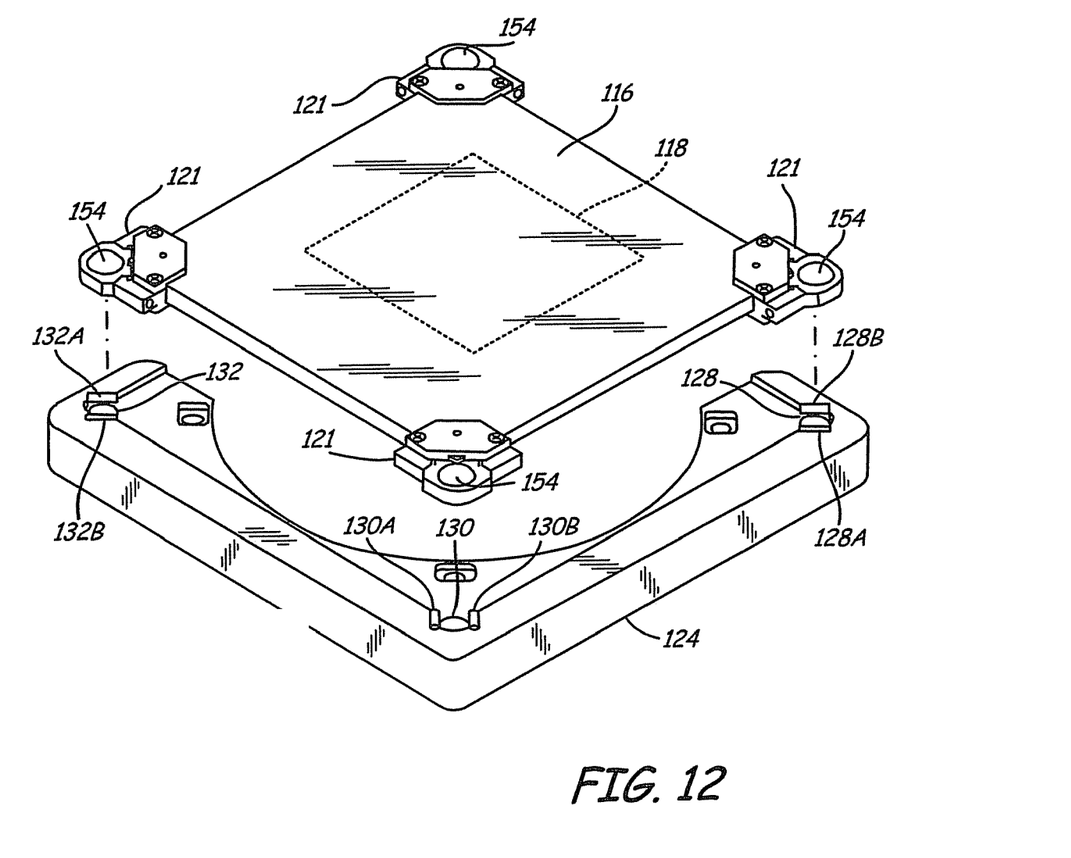
FIG. 12 is a perspective view of a substrate having corner brackets made according to a third form of the present invention thereon.

Referring to FIG. 12, a substrate indicated at 116 of a third form of the invention is the same as the substrate shown in the previous forms of the invention and can comprise a glass plate on which an optical pattern outlined generally in the center portions of the substrate at 118 is to be analyzed. The substrate in this form of the invention has four corner brackets 121, one mounted on each corner of the substrate. The substrate 116 is shown in position to be supported upon a mount plate 124 that corresponds to the mount plate 120, generally, in FIGS. 1 and 1A, and the mount plate in turn can be supported directly on an optical table, rail, bench or the like. The mount plate 124 also can be adapted for adjustably mounting to a base member that in turn is positioned on an optical bench or the like. The mount plate 124 has three recessed sites 128, 130, and 132 that are provided for receiving spherical support balls 154 on three of the corner brackets 121. The recessed sites 128, 130 and 132 are provided with mounting pins or rods 128A and 128B at site 128; 130A and 130B at site 130; and 132A and 132B at site 132. The rods shown in FIG. 11 correspond to the support rods for spherical balls in the first form of the invention.

Figure 13:
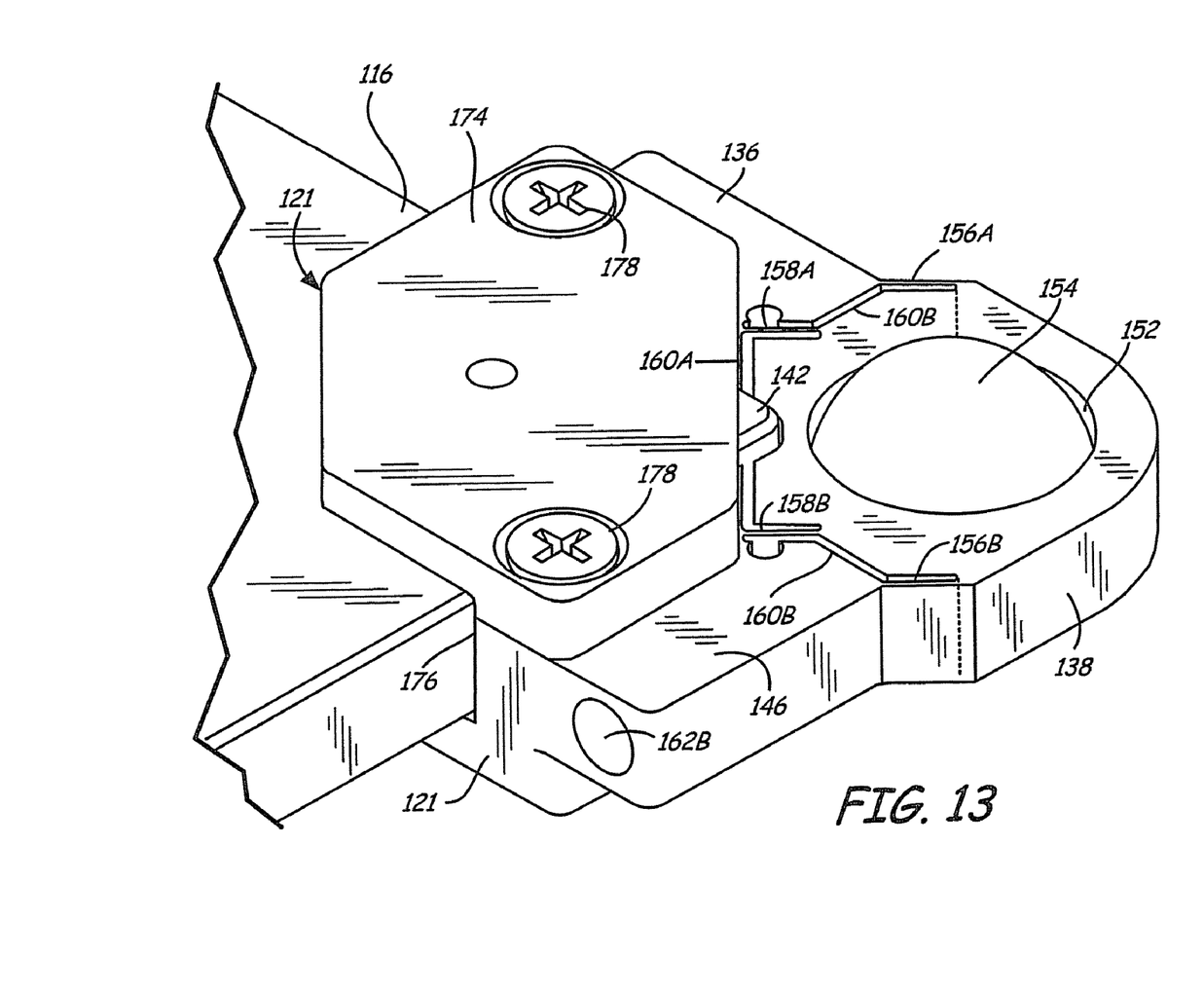
FIG. 13 is an enlarged perspective view of a corner bracket made according to the third form of the present invention.
Figure 14:
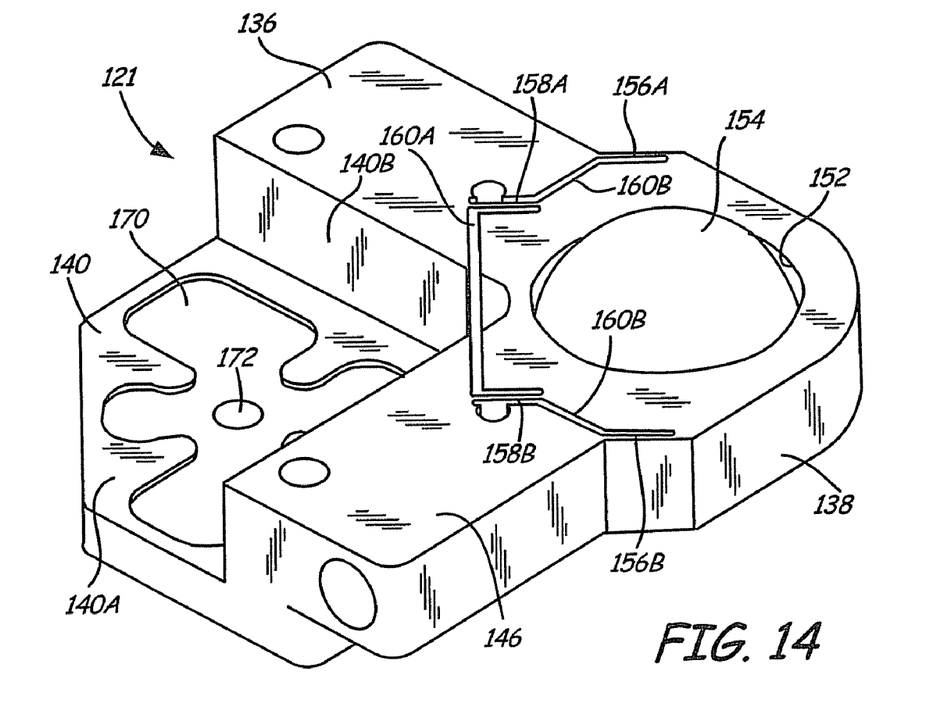
FIG. 14 is a view similar to FIG. 13 with a substrate and a cover plate for holding the substrate removed.

FIGS. 13-16 illustrate the third form of the corner brackets in greater detail. Referring to FIG. 13, the substrate 116 is illustrated only fragmentarily. A corner portion 142 of the substrate is shown in one of the corner brackets 121. The corner bracket 121 has a support portion or main body 136 that supports a ball or sphere mounting housing 138. In this form of the invention, the support portion has a recessed section 140 that receives the respective corner portion 142 of the substrate 116. The recessed section 140 is defined to be of desired height, and this recessed portion is defined by a machined support surface 140A. Guide walls 140B may engage the edges of the corner 142 of the substrate, and holding the corner bracket 121 in position. The corner bracket may preferably be positioned by fixturing, leaving a clearance between guide walls 140B and the substrate. The upper surface of the support portion 136 is indicated at 146, and is a planar surface that extends out to form the upper surface of the ball mounting housing 138. Additionally, to expose the spherical ball 154, the ball mounting housing 138 is of a reduced vertical height and the lower surface of the ball mounting housing is machined up from the bottom surface of the support portion as indicated by the double arrows 150 in FIG. 15.

Figure 15:
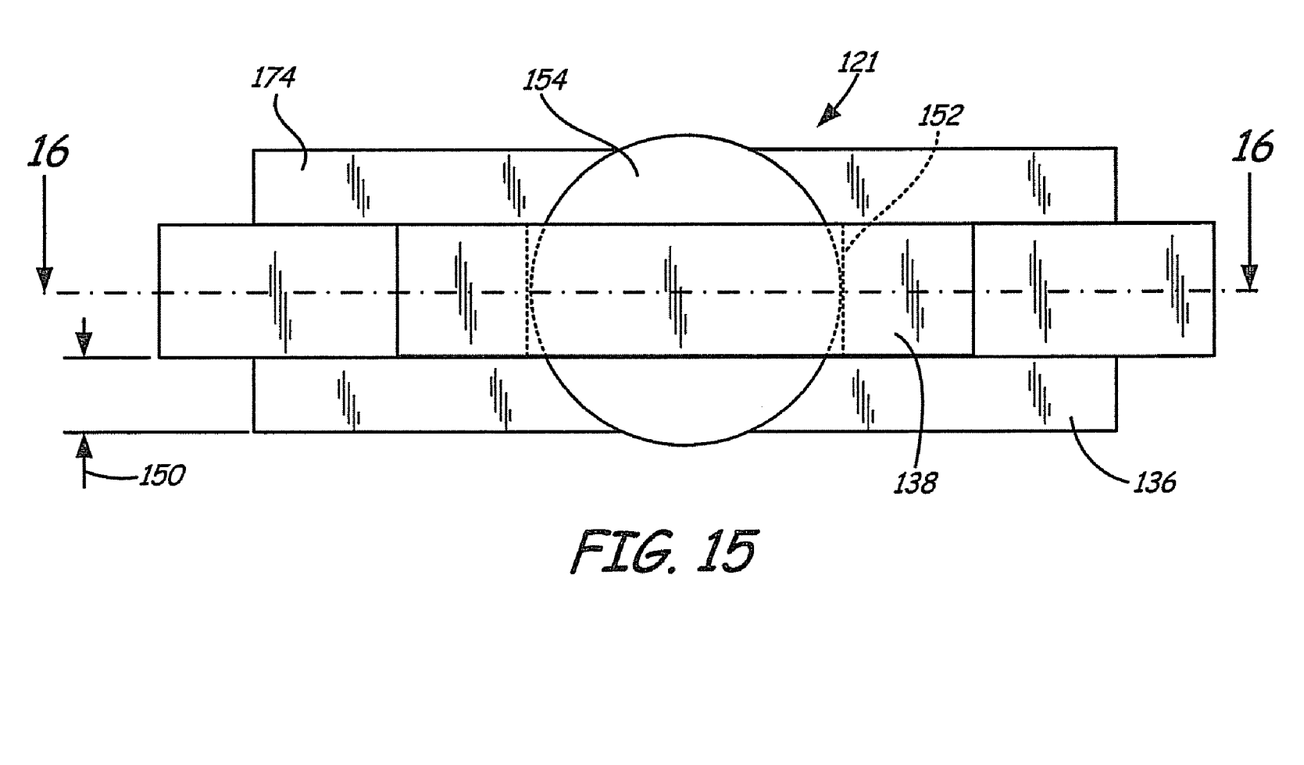
FIG. 15 is a diagonal elevational view of a corner bracket made according to the third form of the present invention.

The ball mounting housing 138 as shown has a bore 152 that receives a spherical ball 154, as in the previous forms of the invention. The ball 154 extends both above and below the ball mounting housing, as shown in FIG. 15.

The ball mounting housing 138 is supported back to the support portion 136 with four flexures. These flexures are indicated at 156A and 156B which are to the outer sides of the ball mounting housing, and 158A and 158B which are positioned inwardly from the edges of the ball mounting housing, closer to the central bisecting plane of the corner bracket. The flexures 158A and 158B are supported back to the support portion 136 as well. The flexures 156A, 156B, 158A and 158B are all parallel to each other and are defined by slots indicated at 160A and 160B that are suitably shaped to provide the thin flexures that permit the ball housing 138 to be adjusted relative to the support portion 136 in a plane parallel to the support surface 140, and thus to the surface of the substrate that has the optical image on it.

The outer side edges of the support portion 136 that are parallel to the sides of the substrate are tapered out to join the opposite sides of the ball mounting housing 138 and the flexures 156A and 156B are integral with the outer side edge portions of the support portion 136.

The flexures 158A and 158B are joined to and integral with the support portion closer to the bisecting plane of the corner bracket, which includes the axis of the bore 152 and bisects the angle between the edge surfaces 140B, which bound the support surface 140A. The spacing between the flexures 158A and 158B is defined by the length of slot 160A. The flexures are the only members that join the ball mounting housing to the support portion 136.

Figure 16:
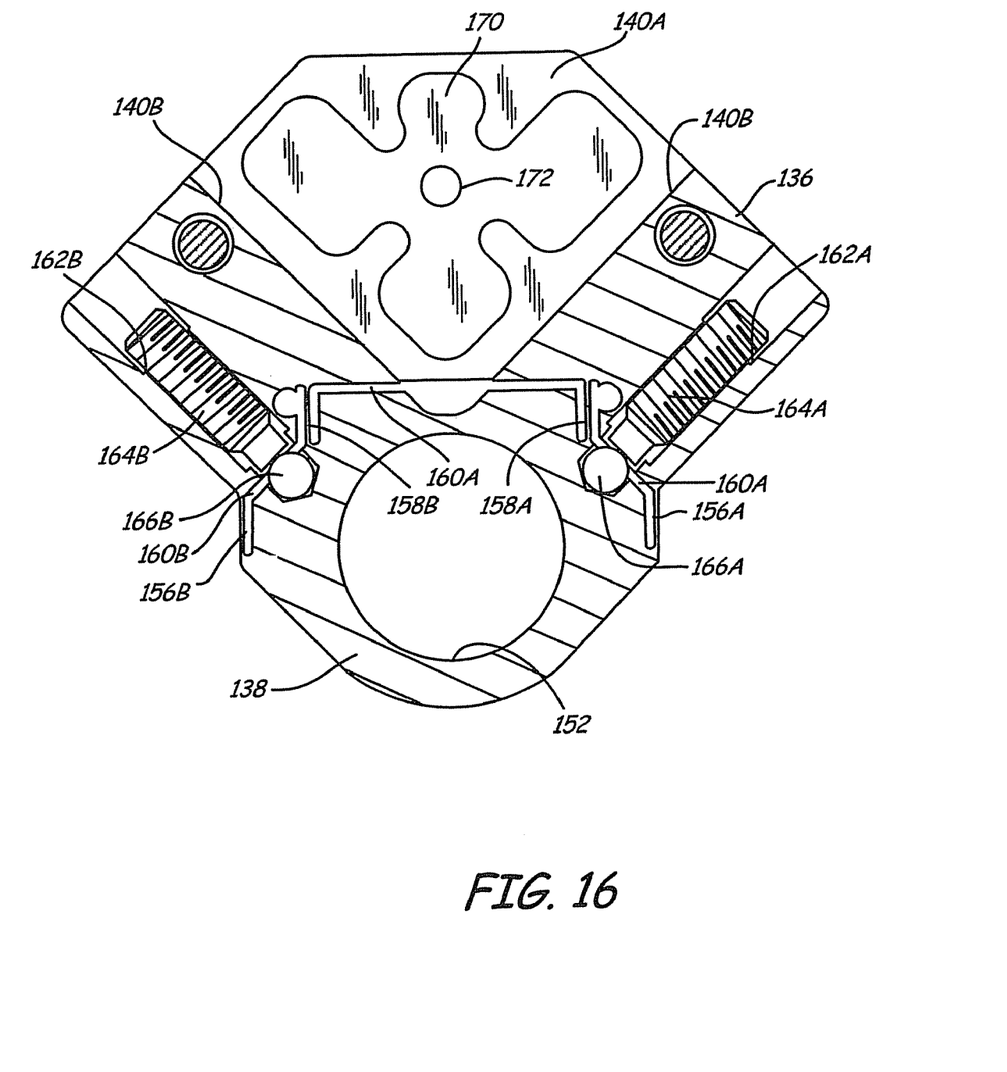
FIG. 16 is a sectional view taken as on line 16-16 in FIG. 15.

As shown in FIG. 16, the support portion 136 has threaded bores 162A and 162B that are positioned for compactness and to tension the flexures with axes parallel to the guide walls 140B so the axes are parallel to the edge surfaces or side surfaces of the substrate 116 on which the corner bracket is mounted. The threaded bores 162A and 162B mount screws 164A and 164B that can be threaded in and out and which have inner ends that bear against balls 166A and 166B carried in recess in side surfaces of the ball mounting housing 138. These ball ends permit the screws that are shown at 164A and 164B to rotate and move longitudinally to shift the ball mounting housing 138 and thus the ball 154 that is retained in the bore 152 parallel to the plane of support surface 140A, and thus the surface of the substrate. The shifting of the ball is to make sure that the ball is centered along the diagonal line of the substrate.

When three of the corner brackets 121 are mounted onto the rods 128A, 128B, 130A, 130B, 132A and 132B, of the mounting plate, the optical pattern 118 will be precisely positioned. The adjustment can take place after the substrate with the corner brackets attached has been placed onto the support plate.

The corner portions 142 of the substrate 116 are securely held in place on the main body portions preferably by the use of a bonding adhesive that fill a precisely machined recess 170 in the support surface 140A of each of the corner brackets. This recess has a thickness that will provide for a layer of adhesive, and an opening 172 is provided through which adhesive may be injected so that the support surface 140A of the corner bracket is in contact with the surface of the substrate.

As can be seen in FIG. 13, an optional cover plate 174 has an offset portion shown at 176 to permit the cover plate to form a slot for receiving the corner portion of the substrate and to be secured against the upper surface 146 of the corner bracket using suitable screws 178. Cover plate 174 does not directly contact substrate 116, but may include a recess similar to 170 and filled with elastomeric adhesive.

The third form of the invention operates essentially the same as the other forms of the invention, but each of the corner brackets supports the respective ball housing on four flexures, rather than two flexures, and the corner bracket has an optional cover plate so that it is a two piece construction for ease of manufacture. The bonding is again done with a controlled thickness layer of adhesive that will not cause misalignment of the corner brackets. The recess 170 and the opening 172 ensures that there will be a contact between the surface and the substrate and the machine surface 140A of each of the corner brackets.

The advantages of having individual corner brackets are achieved, and the four flexures provide for extra rigidity and the ability to control precisely the positions of the ball housings carried by the main portions of the brackets so that the brackets will precisely position the optically patterned substrate.

Although the present invention has been described with reference to preferred embodiments, workers skilled in the art will recognize that changes may be made in form and detail without departing from the spirit and scope of the invention.

What is claimed is:

1. A corner bracket for mounting on a substrate carrying an optical pattern, the corner bracket having a mounting surface for mounting on the substrate, the corner bracket having a housing for mounting a spherical ball with a portion of the spherical ball protruding from the housing to form a support, the housing for the ball being connected to a support portion of the corner bracket having the mounting surface through at least one flexure that permits movement of the housing in a plane substantially parallel to the mounting surface of the corner bracket.

2. The corner bracket of claim 1, wherein said at least one flexure comprises a wall portion that is rigid in a direction perpendicular to the mounting surface and flexes in a direction parallel to the mounting surface.

3. The corner bracket of claim 2, wherein there is at least one adjustment screw threadably mounted in the support portion, the adjustment screw having an end protruding from the support portion and engaging the housing at a side surface thereof and being threadable to adjust the housing position in a plane parallel to the mounting surface.

4. The corner bracket of claim 3, wherein the at least one adjustment screw comprises a pair of adjustment screws mounted on the support portion and engaging the housing on opposite sides, respectively.

5. The corner bracket of claim 3, wherein there is a removable cap overlying the mounting surface and defining a slot for receiving a corner of a substrate.

6. The corner bracket of claim 1 further comprising a bore in the housing for receiving the ball, the ball being bonded to surfaces defining the bore.

7. The corner bracket of claim 1 comprising a slot formed in the support portion and extending inwardly from a side of the corner bracket opposite from the housing, the slot being defined on one side by the mounting surface.

8. The corner bracket of claim 7, wherein the slot has an opening distance perpendicular to the mounting surface sufficient to receive a substrate for mounting the corner bracket.

9. The corner bracket of claim 1, wherein the corner bracket and housing are formed from a single block of material, the housing being separated from the support portion by slots that define the at least one flexure.

10. The corner bracket of claim 9, wherein the slots separating the housing from the support portion define four flexures that are arranged in pairs on opposite sides of the housing.

11. A support for an optical pattern comprising a substrate carrying a pattern on a substrate surface, the substrate having an outer peripheral edge defining at least three corner portions, at least three corner brackets mounted on separate corner portions of the substrate, said corner brackets each having a housing thereon for mounting a spherical ball, and the balls each having a portion that protrudes outside of the respective housing for supporting an exterior support, the corner brackets each including a support portion bonded to the substrate, a flexure hinge supporting the respective housing relative to the support portion of each corner bracket to permit movement of the respective housing parallel to the substrate surface.

12. The support of claim 11, wherein each of the housings for the balls is connected to the support portion of the respective corner bracket by a pair of flexure hinges, each housing having a bore receiving a ball, the flexure hinges mounting each housing to overlie a portion of the substrate surface.

13. The support of claim 12, wherein the housing of each corner bracket is moved in a plane parallel to the substrate surface by adjustment screws threadably mounted in the respective support portion and positioned at substantially right angles to each other, and positioned to engage side surfaces of the associated housing and move the housing relative to the support portion of the respective bracket.

14. The support of claim 11, wherein said flexure hinge comprises a wall portion that is rigid in a direction perpendicular to the substrate surface.

15. A corner bracket for mounting on a substrate and for locating the substrate on a support, the corner bracket having a planar mounting surface supported on a corner portion of the substrate, the corner bracket having a support portion and a ball mounting housing for mounting a spherical ball with a portion of the spherical ball extending outwardly from the housing in direction perpendicular to the mounting surface, at least one flexure connecting the ball mounting housing to the support portion to permit movement of the ball mounting housing in a plane substantially parallel to the planar mounting surface of the corner bracket.

16. The corner bracket of claim 15, wherein said at least one flexure comprises a wall portion that is rigid in a direction perpendicular to the mounting surface and flexes in a direction parallel to the mounting surface.

17. The corner bracket of claim 15, wherein the at least one flexure comprises a plurality of flexures arranged in two pairs on opposite sides of a bisecting plane of the corner bracket perpendicular to the mounting surface and lying along a central axis of the ball mounting housing, each pair of flexures including a first flexure between an outer side of the ball mounting housing and the support portion, and a second flexure between a portion of the ball mounting housing and the support portion and positioned closer to the bisecting plane than the first flexure, all of the flexures comprising parallel flat strips of metal defined by slots, the support portion and the ball mounting housing being otherwise unattached, and being formed from a unitary block of metal.

* * * * *